United States Patent [19]

Butts et al.

[11] Patent Number: 5,079,970
[45] Date of Patent: Jan. 14, 1992

[54] ACCELERATION-BASED CONTROL OF POWER-ON DOWNSHIFTING IN AN AUTOMATIC TRANSMISSION

[75] Inventors: Kenneth R. Butts, Grosse Pointe Woods; Kumaraswamy V. Hebbale, Troy, both of Mich.

[73] Assignee: General Motors Corporation, Detroit, Mich.

[21] Appl. No.: 602,569

[22] Filed: Oct. 24, 1990

[51] Int. Cl.$^5$ .............................................. B60K 41/08
[52] U.S. Cl. ..................................... 74/858; 74/867; 74/85; 192/109 F
[58] Field of Search .......... 74/858, 867, 851; 192/87.12, 87.13, 87.18, 109 F

[56] References Cited

U.S. PATENT DOCUMENTS

| | | | |
|---|---|---|---|
| 3,956,947 | 5/1976 | Leising et al. | 74/866 |
| 4,338,832 | 7/1982 | Pelligrino | 74/867 X |
| 4,476,748 | 10/1984 | Morscheck | 74/867 |
| 4,653,351 | 3/1987 | Downs et al. | 74/866 |
| 4,796,490 | 1/1989 | Butts et al. | 74/866 |
| 4,905,545 | 3/1990 | Leising et al. | 74/867 X |

Primary Examiner—Leslie A. Braun
Assistant Examiner—Daniel Wittels
Attorney, Agent, or Firm—Mark A. Navarre

[57] ABSTRACT

A power-on clutch-to-clutch downshift control is initiated by partially releasing an off-going torque trasmitting device to permit an increase in the transmission input speed. At the same time, an on-coming torque transmitting device is filled in preparation for engagement. When the slip across the on-coming device is near zero, the on-coming device pressure is progressively increased while the off-going clutch pressure is controlled to maintain the near-zero on-coming slip speed condition. When the on-coming device develops significant capacity, a tie-up develops between the on-coming and off-going devices, causing a drop in output shaft acceleration. The drop is detected and used to release the off-going device, the shift being complete when the on-coming device is fully engaged. Engine torque controls are employed to ensure a smooth output torque transition at the end of the shift.

5 Claims, 11 Drawing Sheets

ACCELERATION-BASED CONTROL OF POWER-ON DOWNSHIFTING IN AN AUTOMATIC TRANSMISSION

The present invention relates to an electronic control of a vehicular automatic transmission, and more particularly, to an acceleration-based control of power-on or positive torque downshifting.

BACKGROUND OF THE INVENTION

Event-sequenced electronic controls employed for automatic transmission clutch-to-clutch shifting as an alternative to strict open-loop or closed-loop controls. An example of an event-sequenced control for clutch-to-clutch downshifting is set forth in the U.S. Pat. No. to Butts et al. 4,796,490, issued Jan. 10, 1989, and assigned to the assignee of the present invention. Such controls generally divide a shift into several successive control stages, entry into a given control stage being initiated in response to the detection of a predefined input speed or clutch slippage condition.

SUMMARY OF THE PRESENT INVENTION

The present invention is directed to an event-sequenced control for power-on or positive torque clutch-to-clutch downshifting involving several control stages in the inertia and torque phases of the shift, wherein entry into a completion stage of the shift is initiated in response to the achievement of specified criteria based on the acceleration of the transmission output shaft and clutch slip speeds. On-coming clutch slippage is used to detect achievement of input speed synchronization; output shaft acceleration is used to detect on-coming clutch capacity and to trigger the release of the off-going clutch. The output shaft acceleration is estimated from simple shaft speed measurement through the use of a Kalman filtering technique.

Once the on-coming clutch is filled, the off-going clutch is partially released to permit an increase in the transmission input speed, marking the beginning of the inertia phase. While the input speed is increasing toward the synchronous speed of the desired ratio, the on-coming clutch pressure is held at a value just above the clutch return spring pressure. When the input speed substantially reaches the synchronous speed, as detected by near-zero on-coming clutch slippage, the control enters the torque phase of the shift. In the torque phase, the on-coming clutch pressure is increased toward the transmission line pressure, and the off-going clutch pressure is controlled in closed-loop fashion to maintain the input speed synchronization condition. When the on-coming clutch develops significant torque capacity, a tie-up develops between the on-coming and off-going clutches, causing a drop in output shaft acceleration. The drop is detected by the control, and the off-going clutch is released in ramp fashion once the rate of change in output acceleration exceeds a reference rate. The conclusion of the torque phase, and the shift, occurs when the on-coming clutch is fully engaged. Engine torque controls are employed during the transition between inertia and torque phases to ensure a smooth output torque transition at the end of the shift.

Although the control strategy according to this invention results in a small tie-up condition and a corresponding output torque transient, it achieves consistently high shift quality under all operating conditions by providing a reliable detection of on-coming clutch torque capacity.

BRIEF DESCRIPTION OF THE DRAWINGS

FIG. 1b is a chart indicating the friction clutch engagement patterns required to establish the various speed ranges of the transmission depicted in FIG. 1a.

FIG. 2, Graphs A-C, depict a power-on clutch-to-clutch downshift of the transmission depicted in FIG. 1a, generally identifying the fill, inertia and torque phases of a downshift.

DETAILED DESCRIPTION OF THE DRAWINGS

Figure 1A:
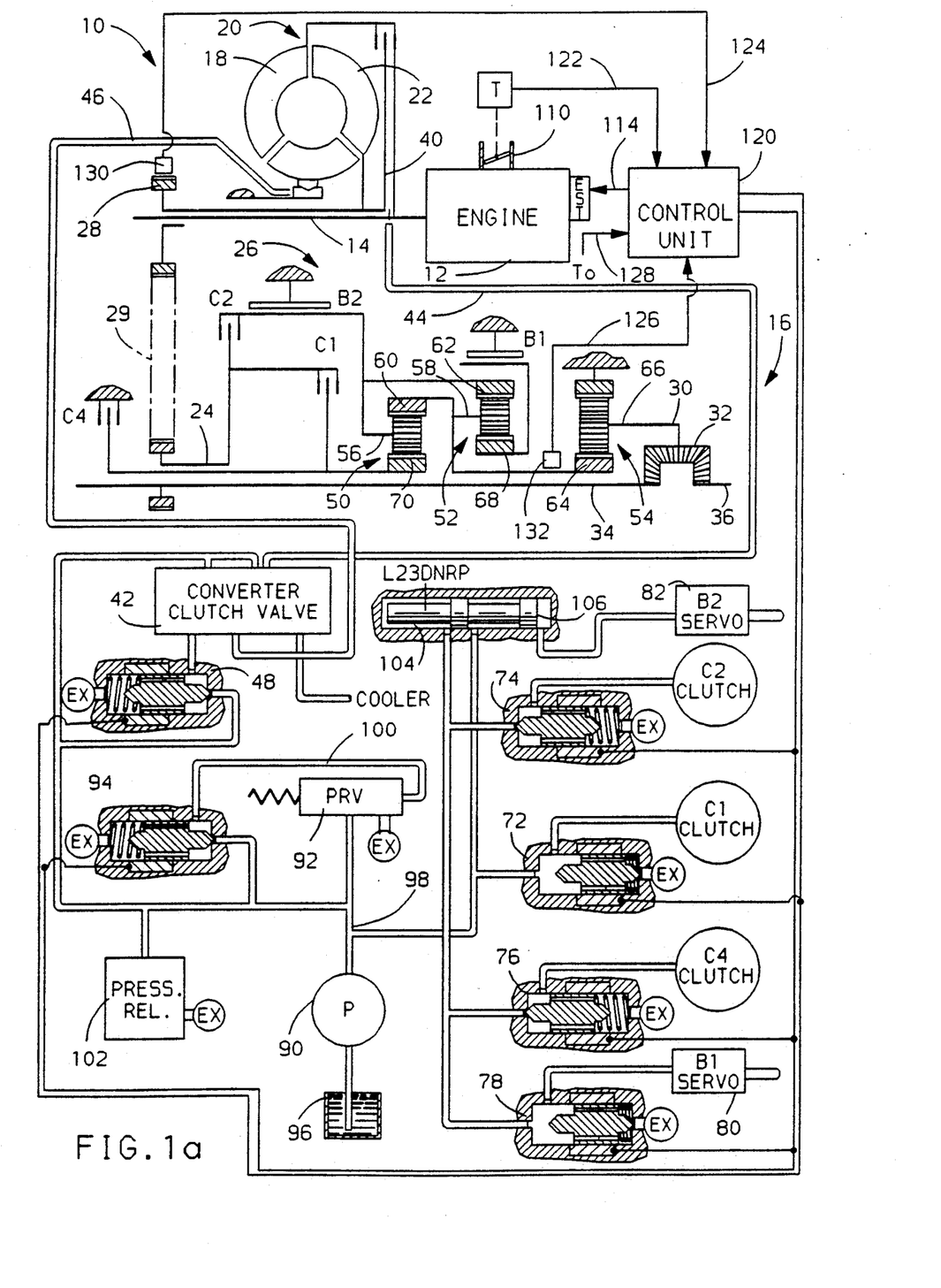
FIG. 1a is a diagram of a motor vehicle powertrain having an automatic transmission and engine controlled according to this invention by a computer-based controller.

Referring particularly to FIG. 1a, the reference numeral 10 generally designates a motor vehicle powertrain comprising an engine 12 connected to rotatably drive the input shaft 14 of an automatic transmission 16. The transmission input shaft 14 is connected to drive the impeller (input) 18 of a fluidic torque converter 20, and the turbine (output) 22 of torque converter 20 is connected to rotatably drive the input shaft 24 of a multi-ratio gearset 26 via the sprocket 28 and chain 29. The output shaft 30 of gearset 26, in turn, is connected to a differential gearset 32, the output shafts 34, 36 of which are connected to drive a pair of vehicle wheels (not shown).

The torque converter 20 also includes a clutch mechanism 40 engageable to mechanically couple the impeller 18 and turbine 22 during specified vehicle operating conditions. When open converter operation is desired, a converter clutch valve 42 supplies converter feed pressure on the release side of the clutch 40 via line 44. The return fluid is vented to a fluid cooler (not shown) via line 46. When closed converter or lock-up operation is desired, the valve 42 directs fluid pressure from the linear actuator 48 to the apply side of the clutch 40 via line 46, while exhausting the area between the clutch 40 and the housing of converter 20 via line 44.

The gearset 26 includes three planetary gearsets, as generally designated by the reference numerals 50, 52 and 54. The planet carriers 56/58 and ring gears 60/62 of gearsets 50/52 are cross-coupled as shown. The carrier and ring gear combination 58/60 provides an input to the sun 64 of gearset 54, the carrier 66 being connected to drive the output shaft 30. The carrier and ring gear combination 56/62 can be connected to the input shaft 24 via clutch C2 or grounded to the case of transmission 16 via the brake B2. The sun 68 of gearset 52 can be grounded to the case via brake B1; the sun 70 of gearset 50 can be grounded to the case of transmission 16 via clutch C4, or connected to the input shaft 24 via clutch C1.

Figures 1B, 2:
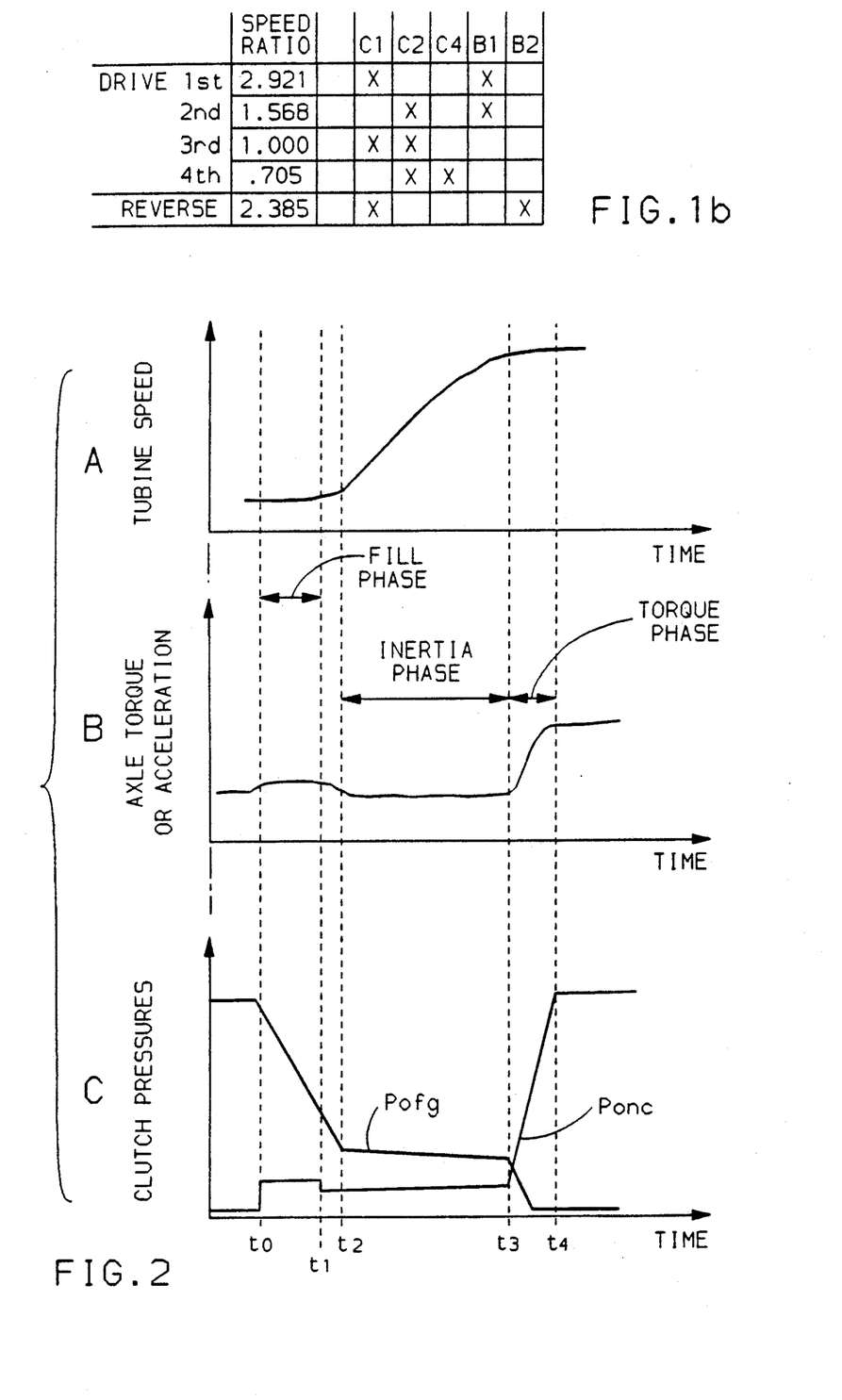

The clutches C1, C2, C4, B1 and B2 are selectively engageable according to the friction element state table of FIG. 1b to provide four forward ratios (1st, 2nd, 3rd and 4th) and one reverse ratio. As indicated in the lower right-hand portion portion of FIG. 1a, the supply of fluid pressure to the clutches C1, C2 and C4 is controlled by the linear actuator valves (LAVs) 72, 74 and 76, respectively; the brake B1 is controlled by LAV 78 and fluid operated servo 80; and the brake B2 is controlled by the manual valve 104 and fluid operated servo 82.

With four forward ranges, three upshifts are possible: 1-2, 2-3 and 3-4. The 1-2 upshift requires concurrent release of the C1 clutch and engagement of the C2 clutch. The 2-3 upshift requires concurrent release of the B1 brake and engagement of the C1 clutch. The 3-4 upshift requires concurrent release of the C1 clutch and engagement of the C4 clutch.

The operating fluid for torque converter 20, servos 80-82 and LAVs 48 and 72-78 is generated by a fluid supply circuit comprising a pump 90, a pressure regulator valve (PRV) 92 and the LAV 94. The pump draws fluid from the reservoir 96, providing pressurized fluid, referred to herein as line pressure, in line 98. The PRV 92 operates in response to a spring bias and a hydraulic bias to regulate the pressure in line 98 by returning a variable portion of the pump output to the reservoir 96. The hydraulic bias is developed by LAV 94, which supplies a controlled pressure to an end land of PRV 92 via line 100. A pressure relief valve 102 limits the line pressure at a predetermined value.

The line pressure developed by the pump 90 is supplied directly to the converter clutch valve 42, the LAVs 48 and 72, and the manual valve 104. The manual valve 104 directs line pressure to LAVs 74-78 and the servo 82 depending on the displacement of its valve spool 106. The spool 106 is mechanically coupled to an operator manipulated range selector (not shown), and is movable to one of seven detent positions corresponding to the transmission ranges. The detent positions, designated L, 2, 3, D, N, R and P, correspond to the 1st, 2nd, 3rd, 4th, Neutral, Reverse and Park ranges, respectively. Line pressure is supplied to the brake servo 82 when the spool 106 is positioned at the R detent. Line pressure is supplied to LAVs 74-78 when the spool 106 is positioned at the 1, 2, 3 or D detents.

The LAVs 48, 94 and 72-78 are single stage solenoid operated pressure regulating devices, each having an armature positioned as a function of the average current supplied to the respective solenoid coil. Due to the linear nature of the valve, substantially no pulsations occur in the supplied pressure signals.

The engine 12 includes throttle 110 adapted to be positioned by the vehicle operator for controlling the engine power output and an electronic spark timing (EST) module for setting the spark timing in accordance with an advance/retard signal on line 114.

The control of the engine EST module and the LAVs 48, 72-78 and 94 is performed by a computer-based control unit 120. In carrying out such control, the control unit 120 responds to various inputs, including a throttle position signal on line 122, a turbine speed signal on line 124, and an output speed signal on line 126. An indication of the engine torque output To may be supplied to the control unit on line 128.

The various input signals are obtained using conventional transducer technology. The throttle transducer T may be a potentiometer, and the speed transducers 130 and 132 may be conventional magnetic speed pick-ups. In the case of the turbine speed transducer 130, the pick-up may be positioned to cooperate with the teeth of chain sprocket 28; in the case of the output speed transducer 132, the pick-up may be positioned to cooperate with teeth formed on an output-related shaft as shown.

The control unit 120 contains conventional computer elements, including a microcomputer, memory elements for storing operating instructions and data, A/D converter elements for conditioning various analog inputs, and input/output elements for receiving and generating the various input and output signals. Flow diagrams representative of computer programs executed by the microcomputer in carrying out the control functions of this invention are described below in reference to the FIGS. 5-11.

Referring to FIG. 2, the Graphs A-C depict on a common time base the turbine speed Nt, the transmission output torque or acceleration, and the commanded on-coming and off-going clutch pressures for an event-sequenced clutch-to-clutch power-on downshift similar to the control disclosed in the Butts et al. patent referred to above. The shift is initiated at time t0 with the filling of the on-coming clutch. The commanded pressure Ponc during the fill period is predefined, and the fill continues for a predetermined duration depicted as t0-t1. Meanwhile, the pressure supplied to the off-going clutch Pofg is progressively reduced until off-going clutch slippage is detected. Technically, the fill period of the on-coming clutch may be delayed since the on-coming clutch apply does not occur until time t3, as described below.

The inertia phase begins at time t2, when the off-going clutch slippage is detected. During the inertia phase, the on-coming clutch pressure is maintained just above the clutch return spring pressure so as maintain the clutch in a filled condition. The reduction of the off-going clutch pressure is suspended to permit a controlled increase in the on-coming clutch slip. During this period, the engine and turbine speeds rise to their post-shift speed values.

The torque phase begins at time t3 when the on-coming clutch achieves a zero-slip condition referred to herein as synchronization. At this time, the on-coming clutch pressure is increased while the off-going clutch pressure is decreased, thereby transferring the input torque from the off-going clutch to the on-coming clutch and completing the shift at time t4. In this phase of the shift, the speed ratio change is reflected in the output torque/acceleration trace of Graph B. Engine controls, such as spark retard, may be used to enhance the smooth transfer of torque from off-going clutch to the on-coming clutch.

In shifts of the above type, it is critical that the on-coming clutch has the required capacity when the off-going clutch is released. Due to uncertainties in the clutch fill process, the required on-coming clutch torque capacity is not always guaranteed. In such cases, the release of the off-going clutch may cause engine flare and degradation of the shift quality. However, the below-described acceleration-based event sequencing of the torque phase provides a level of interactive adjustment which compensates for any manufacturing or environmental variations in clutch performance, thereby to achieve consistent high quality shifting.

Figure 3:
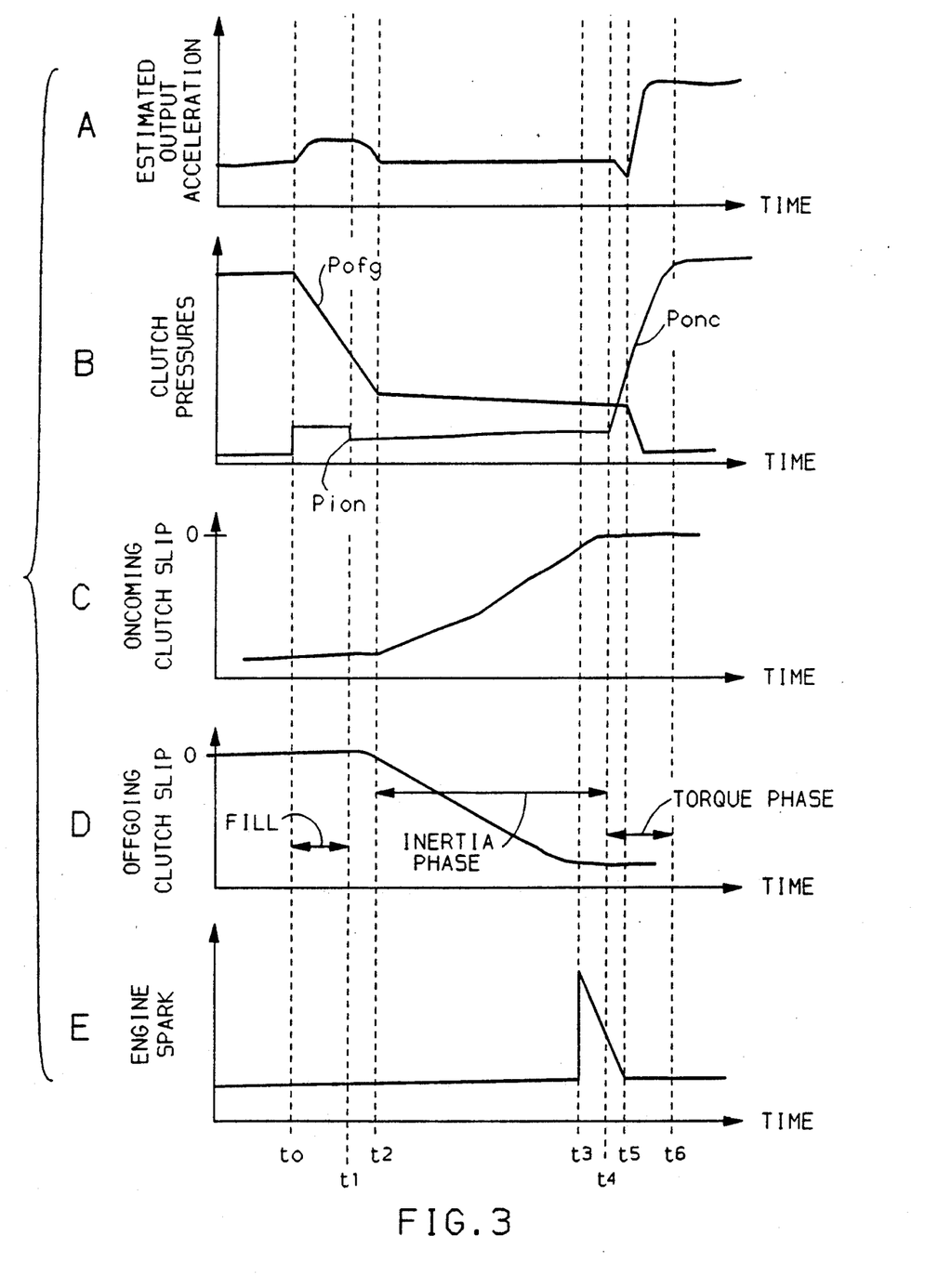
FIG. 3, Graphs A-E, and FIG. 4, Graphs A-C, depict a clutch-to-clutch downshift according to this invention.

FIG. 3 qualitatively illustrates a power-on clutch-to-clutch downshift according to this invention. On a common time base, Graphs A-E depict the estimated acceleration of output shaft 30 (Graph A), the on-coming and off-going clutch pressures Ponc, Pofg (Graph B), the on-coming clutch slip (Graph C), the off-going clutch slip (Graph D) and the engine spark timing retard signal (Graph E).

Figure 4:
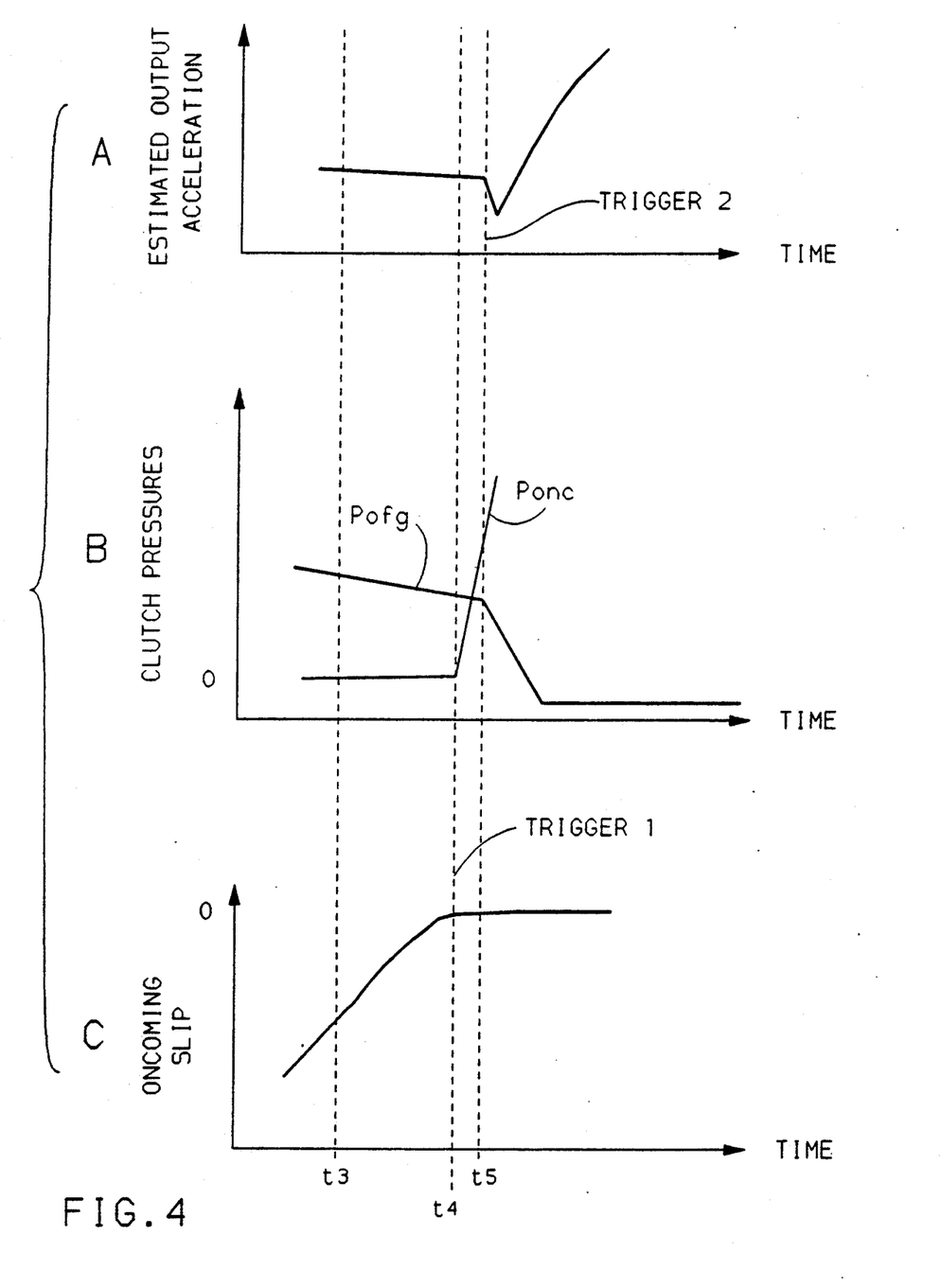

FIG. 4 quantitatively defines, respectively, the pressure control steps, and the shift trigger points used to initiate successive pressure control steps. On a common time base, Graphs A-C depict estimated output acceleration of output shaft 30 (Graph A), the pressure commands for the on-coming clutch and off-going clutch Ponc, Pofg (Graph B), and on-coming clutch slip (Graph C).

Through conventional shift pattern generation techniques, the control unit 120 determines that a power-on downshift is required, and the shift is initiated at time t0 with the start of the on-coming clutch fill phase. The fill time for each clutch and brake servo is a predefined pressure and temperature dependent quantity, which preferably is adaptively updated by a technique such as that disclosed and claimed in the Downs U.S. Pat. No. 4,707,789, et al. issued Nov. 17, 1987, and assigned to the assignee of the present invention. The commanded fill pressure is determined as a combined function of the torque vs. pressure characteristic of the on-coming clutch, the estimated gearset input torque, and the rotating speed of the on-coming clutch. After the clutch is filled at time t1, the command pressure is set just above the clutch return spring pressure and maintained at an input torque dependent value through the inertia phase of the shift.

As soon as the shift is initiated at time t0, the off-going clutch pressure is commanded to ramp down at a predefined rate until off-going clutch slip is detected at time t2. At this point, a closed-loop control of the off-going clutch is initiated to conform the on-coming clutch slippage to a smooth time-based profile similar to that depicted in Graph C of FIG. 3. When the on-coming clutch slip approaches synchronization (zero-slip condition) at time t4, the inertia phase is complete.

The graphs of FIG. 4 detail the triggers employed to sequence the torque phase control steps. The first torque phase trigger TRIGGER1 occurs at time t4 when the on-coming clutch slip reaches synchronization. At this moment, the on-coming clutch pressure command Ponc is increased at a predefined ramp rate towards the transmission line pressure. At the same time, the off-going clutch pressure command Pofg is held constant at the level which was previously calculated from the closed-loop control. This induces a tie-up condition between the on-coming and off-going clutches, and the output shaft acceleration starts decreasing, as best seen in Graph A of FIG. 4.

The control unit 120 monitors the drop in output acceleration and initiates the second trigger TRIGGER2 when the rate of decrease in output acceleration exceeds a reference rate. At this point, shown as time t5, the off-going clutch pressure Pofg is ramped down to zero at a predefined ramp rate. The on-coming clutch pressure Ponc continues to increase at the previous ramp rate. The torque phase is completed at time t6 when the off-going clutch pressure becomes zero and the on-coming clutch has enough torque capacity to carry the input torque.

The engine control comprises a controlled retard of the spark timing during the transition from the inertia phase to the torque phase. When the on-coming clutch slip exceeds a predefined negative value at time t3. The engine spark timing is retarded as shown at time t3 in Graph E of FIG. 3 by an amount to reduce the engine output torque by a predefined amount. The spark retard is ramped out immediately at an open-loop ramp rate, thereby ensuring a smooth torque transient upon completion of the shift.

Figure 5:
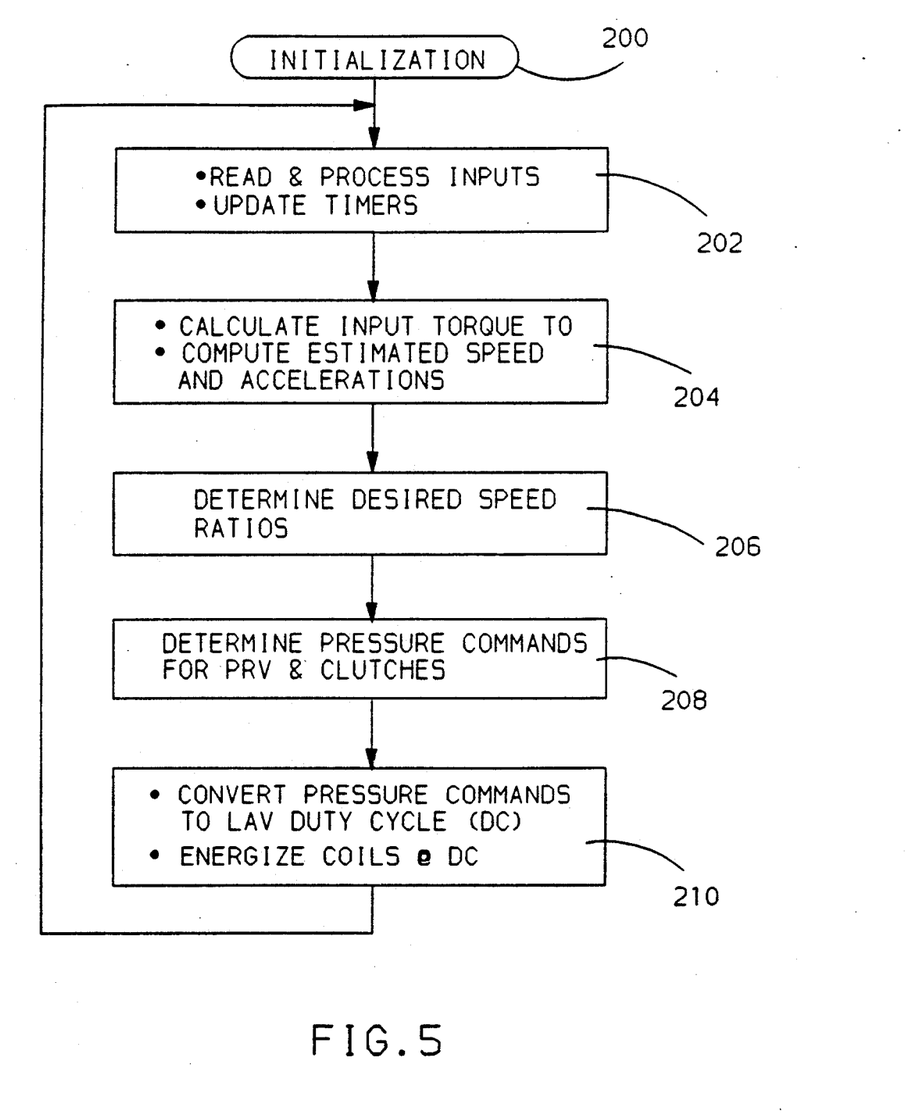
FIGS. 5-11 are flow charts representative of a computer program executed by the controller of FIG. 1a in carrying out the control of this invention.

The flow charts of FIGS. 5-11 represent a single computer program executed by the control unit 120 for carrying out the control of this invention. The main or executive loop is depicted in FIG. 5, and comprises the instruction blocks 202-210, which are repeatedly and sequentially executed during the operation of the vehicle as indicated by the flow diagram lines. The block 200 designates a set of program instructions executed at the initiation of each period of vehicle operation for initializing the various registers, timers, etc. used in carrying out the control functions of this invention.

The block 202 reads and processes the various input signals applied to the control unit input/output device and increments the control timer units. The block 204 calculates various terms used in the control of this invention, such as transmission input torque To (if not otherwise available), and estimated speed and acceleration of output shaft 30 from speed measurements. As indicated above, the speed and acceleration estimates are determined from the measured output (No) speed data, using a Kalman filtering technique. For output shaft, the Kalman equations for speed W, acceleration A, and jerk J are as follows:

$$W = W(last) + T * A(last) + H1 * EE,$$

$$A = A(last) + T * J(last) + H2 * EE, \text{ and}$$

$$J = J(last) + H3 * EE$$

where the parenthetical "last" indicates a previously computed value, the terms H1, H2, and H3 are filter gain values, T is the sampling interval of the speed measurement No and the term EE is an estimation error given by the expression:

$$EE = No - W(last) - T * A(last)$$

Block 206 determines the desired speed ratio based on inputs including throttle position, vehicle speed and manual valve position. Block 208 determines clutch and band pressure commands for effecting a shift, if required. The pressure commands for pressure regulating valve PRV and nonshifting clutching devices are also determined. Block 210 converts the pressure commands to PWM duty cycle values for producing the required coil current in LAVs 48, 72-78 and 94.

Figure 6:
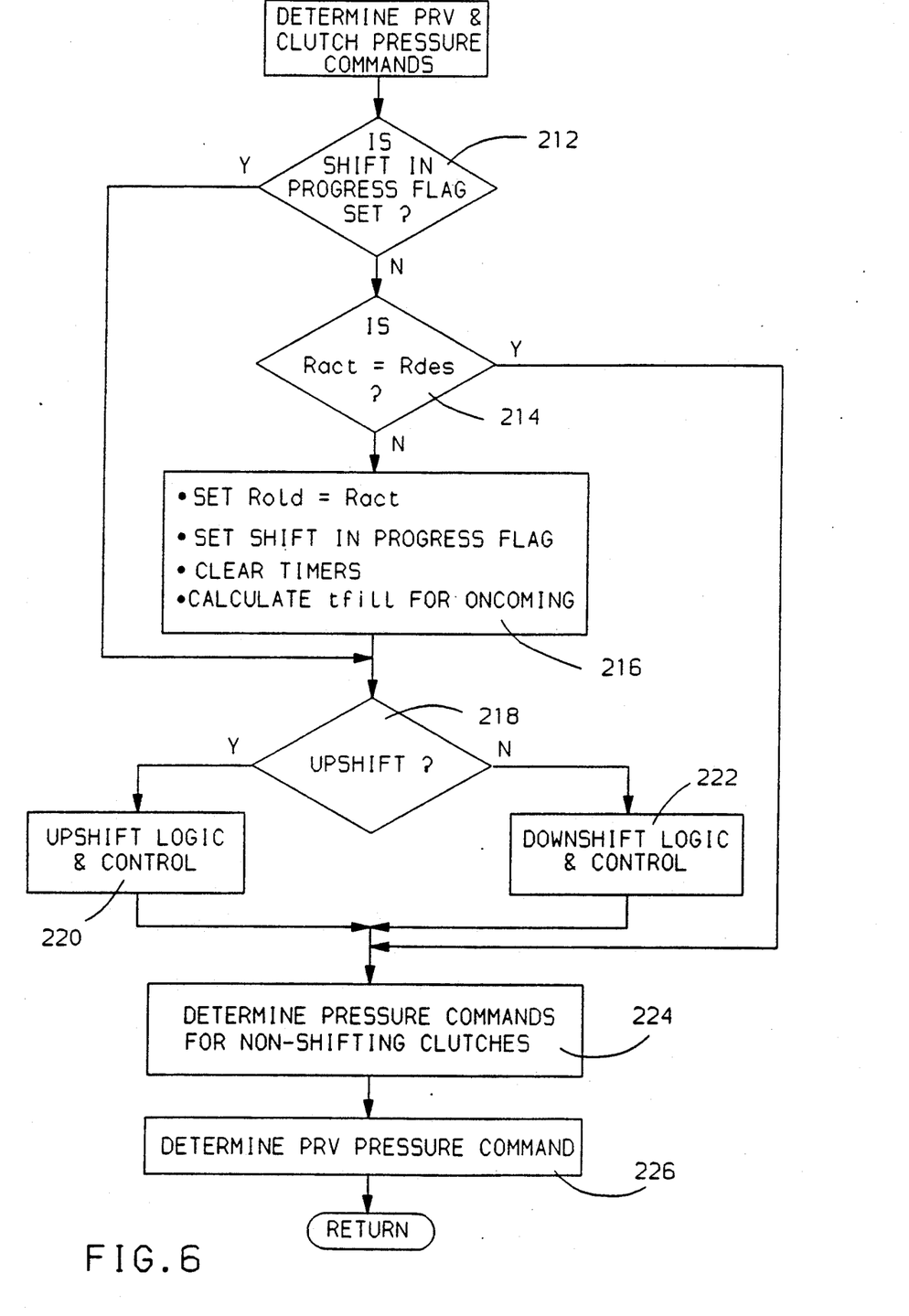

The flow diagrams of FIGS. 6-11 set forth the clutch and PRV pressure determination algorithm mentioned above in reference to block 208. Referring to FIG. 6, the decision block 212 determines if a shift is in progress as indicated by the SHIFT IN PROGRESS flag. If the flag is set, then control jumps to block 218, and the appropriate pressure commands are developed for the clutching devices involved in the shift—block 220 for an upshift, or block 222 for a downshift. If the SHIFT IN PROGRESS flag is not set, the decision block 214 is executed to determine if the actual speed ratio is equal to the desired speed ratio. If the two ratios are the same, then a shift is not required, and the control jumps to block 224. If a shift is required, block 216 is executed to set up the initial conditions for a ratio shift. This block sets the old ratio Rold to the actual ratio Ract, sets the SHIFT IN PROGRESS flag, clears the shift timers, and computes the fill time tfill for the on-coming clutch.

As indicated above, the fill time tfill is determined as a function of the fluid pressure and temperature. As above, the blocks 218-222 are then executed to compute the appropriate pressure commands for the clutching devices involved in the shift. Blocks 224 and 226 are then executed to determine pressure commands for the non-shifting clutches and the pressure regulating valve PRV.

Figure 7:
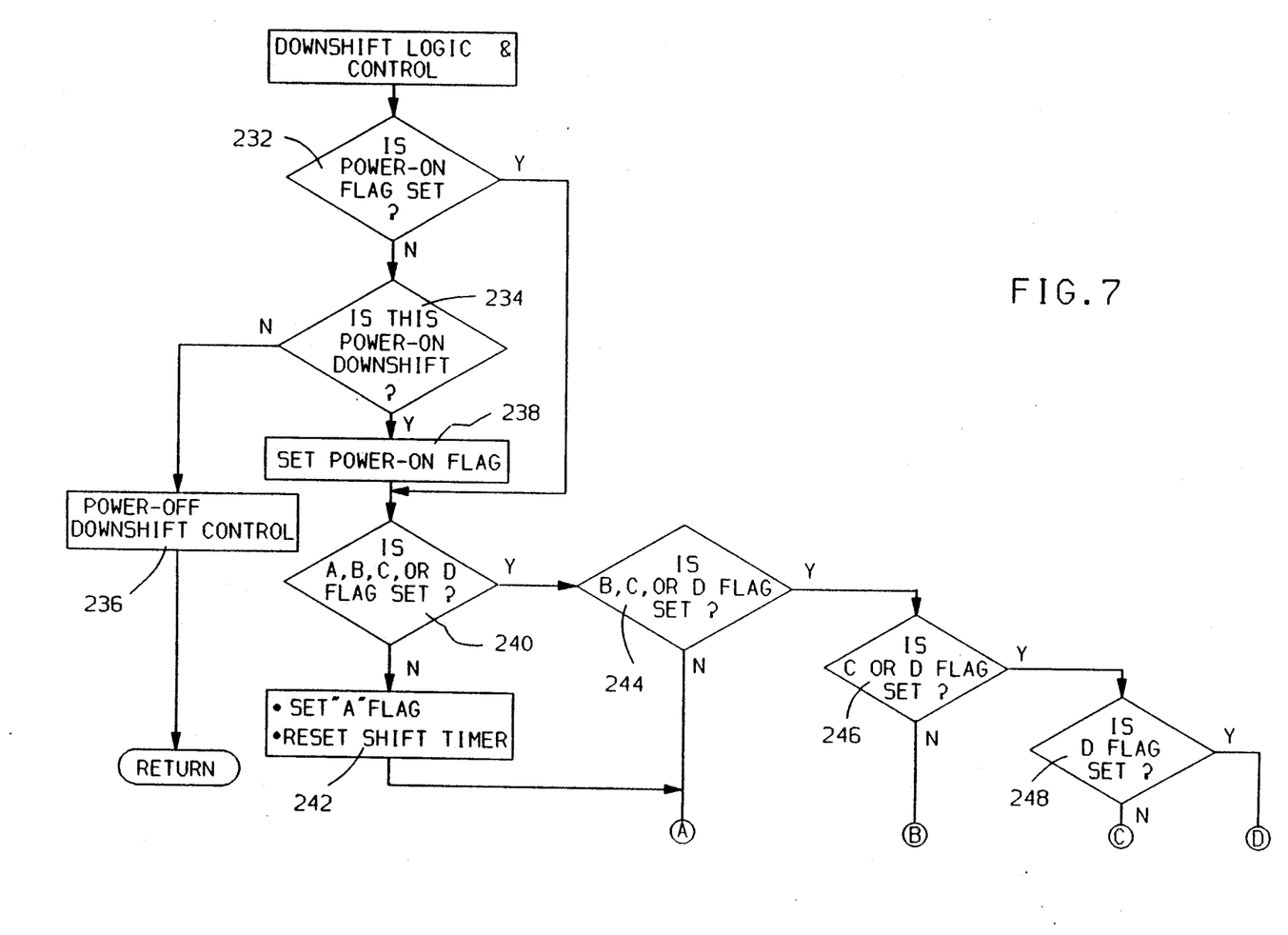

The block 222 instructions for developing actuator pressure commands and engine spark commands for a power-on downshift are set forth in further detail in the flow charts of FIGS. 7-11. Referring to FIG. 7, the decision block 232 is first executed to determine whether a power-on downshift is already in progress. If the POWER-ON flag is not already set, decision block 234 determines whether the shift to be executed is power-on or power-off type. If a power-off downshift is to be executed, block 236 is executed to carry out the shift. Since this invention is directed to a power-on downshift, the instructions for a power-off downshift are not described.

If decision block 234 is answered in the affirmative, the POWER-ON flag is set at block 238 and the decision block 240 is executed to determine which phase of the power-on downshift is in effect. The four flags A, B, C and D are used to designate the active phase. Flag A represents initial phase which includes on-coming clutch fill and off-going pressure ramp, flag B the inertia phase, flag C the torque phase, and flag D the completion phase. If none of the flags are set, it means that the shift has been just initiated and block 242 is executed to set flag A and to reset the shift timer. Decision blocks 244, 246 and 248 determine which set of control instructions have to be executed. The control instructions for the A phase of the shift are depicted in the flow chart of FIG. 8, the B phase in FIG. 9, the C phase in FIG. 10 and the D in FIG. 11.

Figure 8:
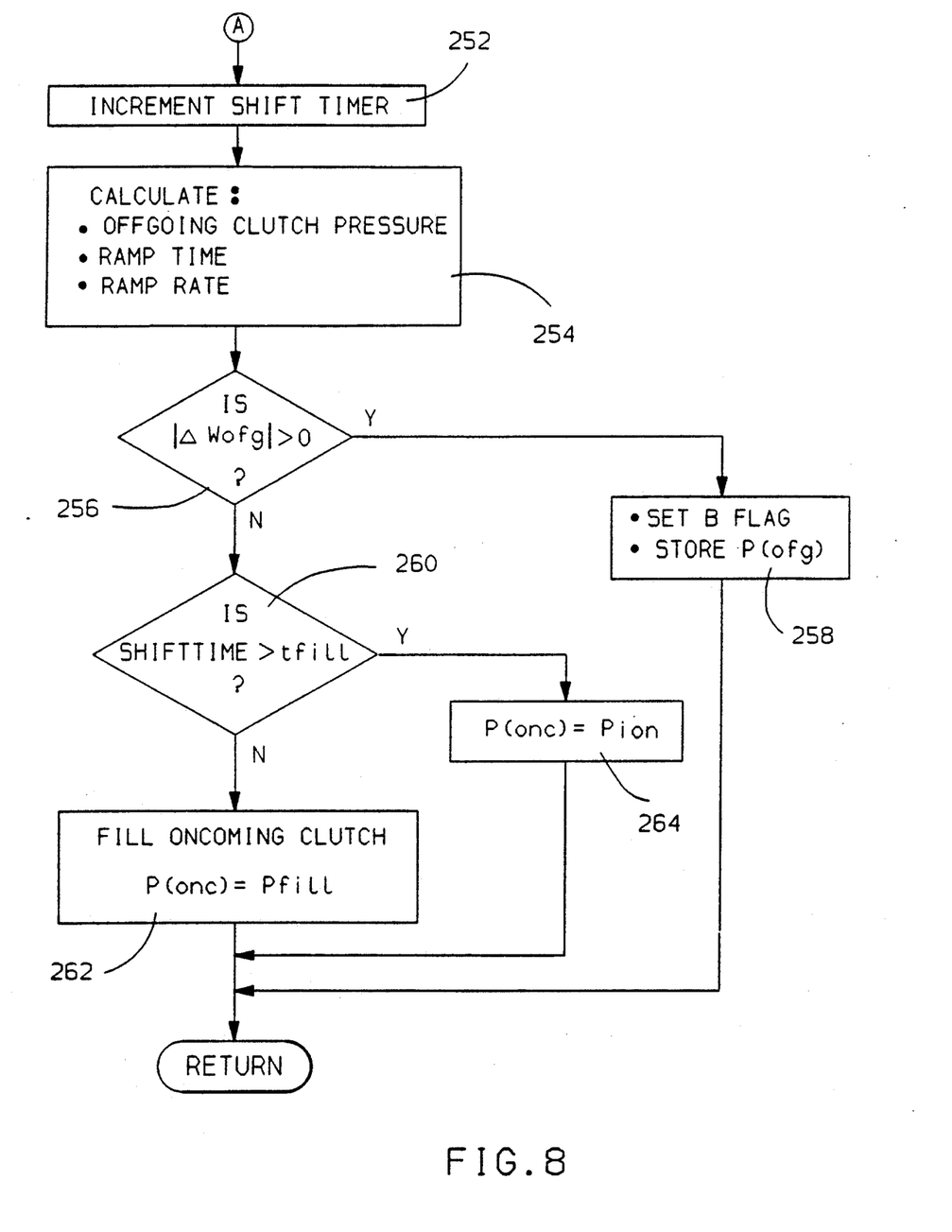

Referring to the initial (A) phase of FIG. 8, the block 252 is first executed to increment the shift timer. Block 254 then calculates the off-going pressure, a ramp time (RAMP TIME 1) and a ramp rate at which the pressure is to be reduced. The off-going clutch slippage is checked in block 256. If the clutch is slipping, then Block 258 is executed to set B flag and store the off-going pressure command for inertia phase calculations. At this stage, the controls exit Phase A; if the on-coming fill is not completed at this stage, then the fill has to be continued in Phase B. If the off-going clutch is not slipping, the decision block 260 is executed to determine if the fill phase is completed, based on the fill time term tfill. If not, the block 262 is executed to set the on-coming clutch pressure command to a predetermined fill pressure Pfill. When the fill phase is complete, the block 264 is executed to set the on-coming clutch pressure Ponc to a predetermined initial pressure Pion, which is sufficient to prevent the clutch return spring from unfilling the clutch.

Figure 9:
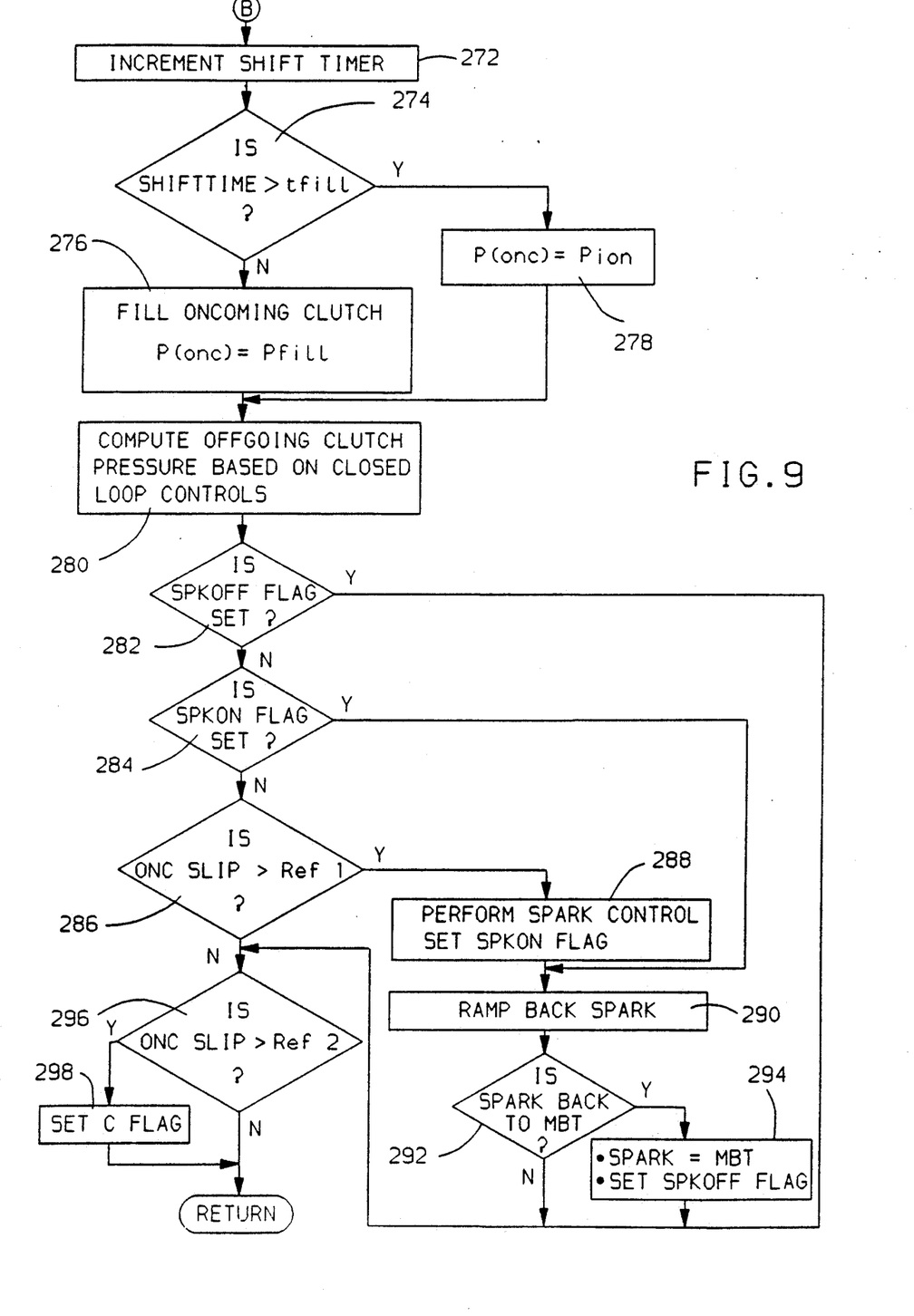

Referring to the inertia (B) phase of FIG. 9, the blocks 272 and 274 are first executed to increment the shift timer, and to determine if the fill is completed. As explained above, if the fill is completed, then the on-coming pressure is set to Pion in block 278. If the fill is not completed, the pressure Pfill is commanded on the on-coming clutch in block 276. A closed-loop control of the off-going clutch pressure is initiated in block 280 with the feedback term being the on-coming clutch slip and the desired slip set to a smooth profile as shown in Graph C of FIG. 3.

Block 282 is initiated to check whether flag SPKOFF is set. If the SPKOFF flag is not set, then SPKON flag is checked in block 284. If SPKON flag is not set, the on-coming slip is checked in block 286 to see if the spark control needs to be started. If the on-coming slip is greater than a negative reference value REF1, the spark control is initiated in block 288 and the SPKON flag is set. Thereafter, decision block 284 is answered in the affirmative, and blocks 286-288 are skipped. The spark retard is immediately ramped back towards the MBT (Minimum spark timing for Best Torque) value at a predefined rate as indicated at block 290. Block 292 checks to see if the spark timing is back to the MBT value. If yes, then block 294 sets the spark equal to its MBT value, and the SPKOFF flag is set. Thereafter, decision block 282 is answered in the affirmative and blocks 284-294 are skipped. Block 296 is executed next to check whether on-coming slip is greater than another predefined negative reference value REF2 corresponding to the synchronization synchronization, flag C is set in block 298 and Phase B is exited. At this stage, the spark control may still be active and if so, it must be completed in Phase C. If the decision block 296 is answered in the negative, the control of Phase B is continued in the next loop.

Figure 10:
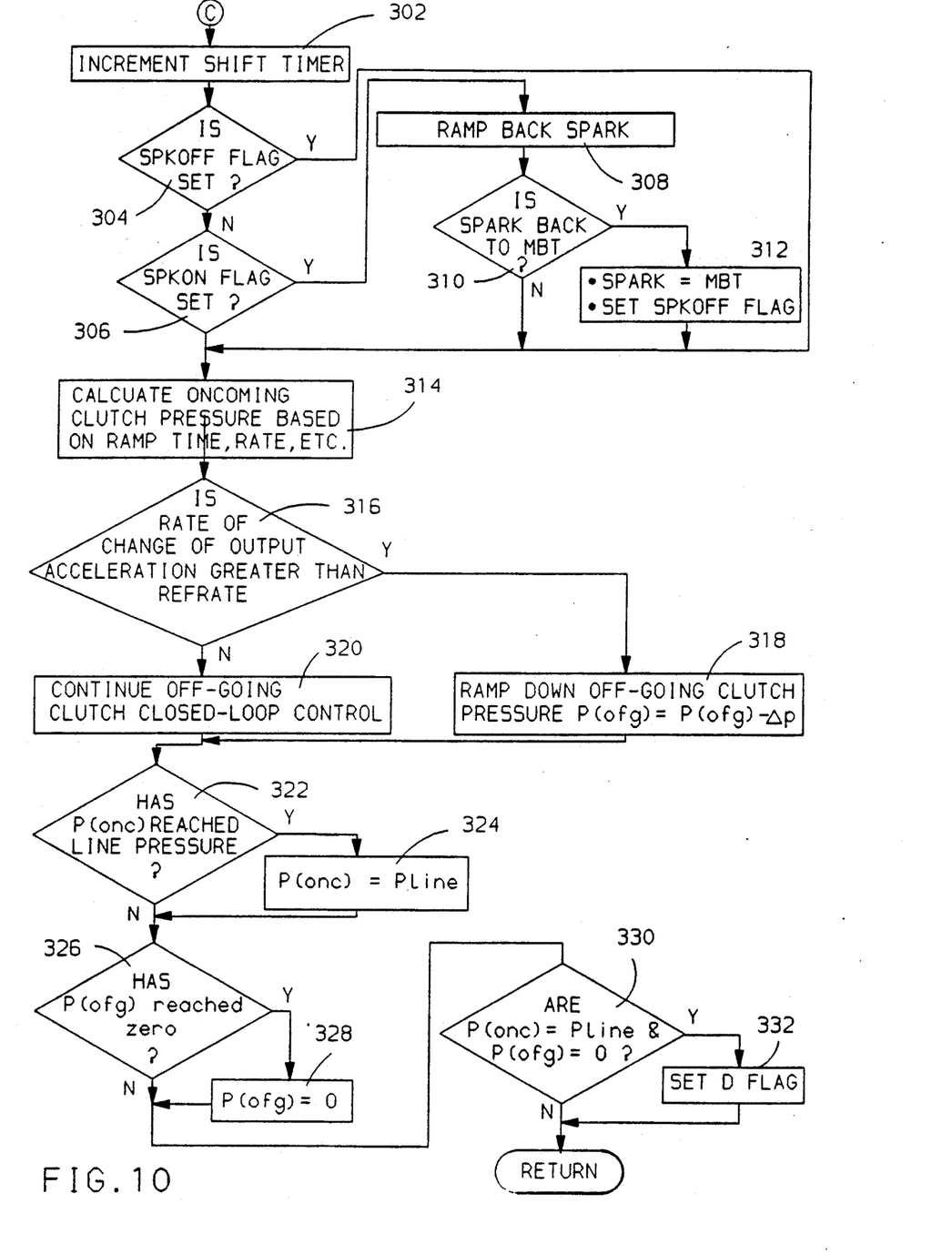

Referring to the torque (C) phase of FIG. 10, the block 302 is first executed to increment the shift timer. If the SPKOFF flag is not set, then SPKON flag is checked in block 306. As explained above, blocks 308-312 are executed to bring the spark back to MBT value. If the SPKOFF is set, as determined by the decision block 304, the blocks 306-312 are skipped.

Block 314 calculates the on-coming pressure based on ramp rate, ramp time, etc. In block 316, the rate of decrease in output shaft acceleration is compared to a predefined rate REFRATE. If the actual rate exceeds the reference rate, the off-going pressure ramp down is initiated at a predefined ramp rate, as indicated at block 318. If the actual rate is less than the reference rate, block 320 continues the closed-loop control of the off-going pressure.

Blocks 322 and 324 check to see if the on-coming clutch pressure has reached the line pressure. Similarly, blocks 326 and 328 check to see if the off-going pressure has exhausted completely. In block 330, it is checked to see if both pressures have reached their post-shift values. If yes, Flag D is set in block 332 and Phase C is exited.

Figure 11:
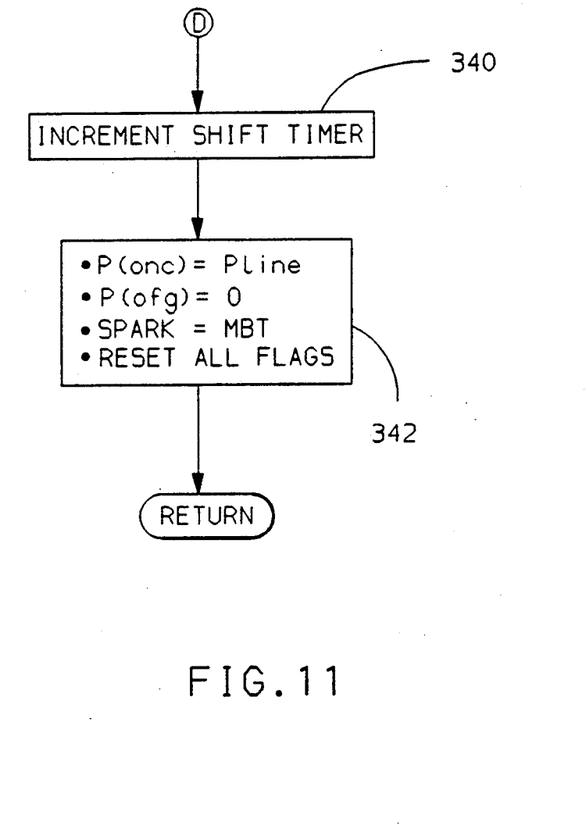

Referring now to the completion (D) phase of FIG. 11, the blocks 340-342 are executed to increment the shift time, to set the on-coming and off-going clutch pressures to their post shift values, and to set the spark to the MBT value. All flags are reset before exiting Phase D.

While this invention has been described in reference to the illustrated embodiment, it is expected that various modifications will occur to those skilled in the art. In this regard, it should be understood that controls incorporating such modifications may fall within the scope of this invention as defined by the appended claims.

The embodiments of the invention in which an exclusive property or privilege is claimed are defined as follows:

1. A method of downshifting a motor vehicle automatic shift power transmission having an input driven by a vehicle engine, and an output connected to drive a vehicle wheel, where downshifting involves releasing an off-going pressure to disengage an off-going torque transmitting device while increasing an on-coming pressure to engage an on-coming torque transmitting device, the method comprising the steps of:

controlling the release of the off-going pressure so as to allow the engine to increase the input to a synchronous speed at which a slip speed across the on-coming torque transmitting device is near zero, and thereafter controlling the off-going pressure at a level to maintain the input at such synchronous speed;

initiating a progressive increase of the on-coming pressure when the input approaches said synchronous speed, thereby to progressively engage the on-coming torque transmitting device;

monitoring the acceleration of the transmission output to detect a drop indicative of a tie-up condition characterized by concurrent engagement of the off-going and on-coming torque transmitting devices; and fully releasing the off-going pressure when the tie-up condition is detected, the downshift being complete when the on-coming pressure fully engages the on-coming torque transmitting device.

2. The method set forth in claim 1, wherein the step of controlling the release of the off-going pressure includes the steps of:

releasing the off-going pressure at an open-loop ramp rate until slippage of the off-going torque transmitting device is observed; and thereafter initiating a closed-loop control of the off-going pressure for increasing the input to said synchronous speed and maintaining the input at said synchronous speed.

3. The method set forth in claim 1, wherein the step of initiating a progressive increase of the on-coming pressure includes the steps of:

increasing the on-coming pressure to a fill pressure for a predetermined fill period to fill the on-coming torque transmitting device in preparation for its engagement;

reducing the on-coming pressure at the end of the fill period to a level sufficient to maintain the on-coming torque transmitting device in a filled condition; and increasing the on-coming pressure at an open-loop ramp rate when the input approaches said synchronous speed to progressively engage the on-coming torque transmitting device.

4. The method set forth in claim 1, wherein the step of monitoring the acceleration of the transmission output includes the steps of:

comparing the rate of decrease in said output acceleration to a reference rate of decrease; and indicating the occurrence of a tie-up condition when the monitored rate of decrease exceeds the reference rate of decrease.

5. The method set forth in claim 1, wherein the engine is a spark ignition internal combustion engine having an adjustable spark timing control, and the method includes the steps of:

initiating a retardation of the engine spark timing control when the magnitude of the slip speed across the on-coming torque transmitting device becomes less than a reference slip magnitude; and thereafter removing the retardation of the engine spark timing control at a predefined rate.

* * * * *